Nov. 7, 1961 W. C. WAYNE, JR 3,007,361
MULTIPLE VIBRATO SYSTEM
Filed Dec. 31, 1956 2 Sheets-Sheet 1

INVENTOR
William C. Wayne, Jr.
BY
W. H. Breunig
AGENT

MULTIPLE VIBRATO SYSTEM

Filed Dec. 31, 1956 2 Sheets-Sheet 2

INVENTOR
William C. Wayne, Jr.

BY W. H. Brenning
AGENT

United States Patent Office 3,007,361

Patented Nov. 7, 1961

3,007,361

MULTIPLE VIBRATO SYSTEM

William C. Wayne, Jr., South Fort Mitchell, Ky., assignor to The Baldwin Piano Company, Cincinnati, Ohio, a corporation of Ohio Filed Dec. 31, 1956, Ser. No. 631,651

8 Claims. (Cl. 84—1.01)

The present invention relates generally to systems for achieving ensemble or chorus effect[1] in electronically generated music.

Briefly describing a preferred embodiment of the present invention in its generic sense, the phase of an audio frequency may be modulated, in order to provide vibrato effect, since phase modulation of a signal frequency provides frequency deviations thereof. True vibrato effect is, as used here, frequency modulation of audio tones in which the percentage frequency deviation remains constant for all audio frequencies, and in which both the percentage deviations and the frequency modulation are and may preferably be in the order of 2% (peak to peak) and 7 cycles per second, respectively. When audio frequencies are phase modulated, a percentage frequency deviation occurs which varies inversely with the modulated frequency, instead of remaining constant as is the case when audio frequencies are subjected to true frequency modulation. On the other hand, percentage frequency deviation varies directly with the amplitude of the modulating signal and with the frequency of the modulating signal.

It follows that approximately constant percentage frequency deviation may be accomplished over a band of audio frequencies, to approximate a true vibrato effect, provided the band is divided into sub-bands of appropriate width, say one octave, and provided the content of each sub-band be phase modulated in response to a modulating frequency of suitable amplitude and/or suitable frequency to produce the desired percentage frequency deviation and rate of modulation for the sub-band. If the amplitudes only of the modulating signals are adjusted properly, the net effect is to approximate conventional vibrato effects over the audio band, and the approximation may be made as close as desired by reducing the widths of the sub-bands and increasing their number. If, on the other hand, the modulating frequency is not the same for the several sub-bands, the modulating frequencies and their amplitudes may be suitably selected to achieve constant or approximately constant percentage frequency deviation of all the audio frequencies of the audio band along with multiple rates of modulation. An extremely desirable ensemble or chorus effect is thus achieved, especially if the modulating frequencies employed are independent of one another or asynchronous, in the sense that they are not harmonically related. Moreover, if desired, further interest may be achieved by also varying the amplitudes and/or frequencies of the modulating sources in a random manner.

Moreover, musical interest may be added by employing two separate electro-acoustic transducers, one for the modulated or processed program and one for the unmodulated program. A pleasing spatial effect is achieved in this manner, subjective loudness being magnified, aesthetic appeal being heightened, and an apparent larger physical tonal volume being imparted to the radiated music. In this respect, further random effects may be attained by also employing the conventional type of frequency modulation applied directly to the primary audio frequency signal source in tandem with the complex vibrato modulation generated in accordance with the principles and methods of the present invention.

It is, accordingly, a board object of the present invention to provide a novel system for achieving chorus effect in a complex electrical signal obtained from electronic musical instruments, a motion picture sound track, a phonograph reproducing amplifier, a microphone amplifier, and the like.

[1] Inherent in systems having more than one source for each pitch.

It is a further object of the present invention to provide a system of vibrato modulating electronic music, in which sub-bands of an audio band representative of musical tones are each differentially vibrato modulated.

It is another object of the present invention to phase modulate a plurality of musical tones as a way of introducing vibrato effects, the several harmonic or partial[2] components of the tones being modulated at different vibrato frequencies, but at approximately constant percentage frequency deviations.

Another object of the present invention relates to the provision of a system for processing a band of audio frequencies for the purpose of introducing chorus effect, by differently modulating successive octaves of the band, whereby different harmonic or partial frequencies pertaining to the same tone are differently modulated.

A further object of the invention resides in the provision of a system for processing a band of audio frequencies representative of music, by phase modulating sub-bands of the band of audio frequencies each in response to a different vibrato frequency but to approximately the same percentage frequency deviation.

An additional object of the invention is the provision of an all-electronic device which may be applied to any desired channel or division of an electronic musical system for the purpose of introducing chorus effect thereto without the need for access to and direct modulation of the primary sources.

The above and still further objects, features and advantages of the present invention will become apparent upon consideration of the following detailed description of one specific embodiment thereof, especially when taken in conjunction with the accompanying drawings, wherein.

Figure 5:
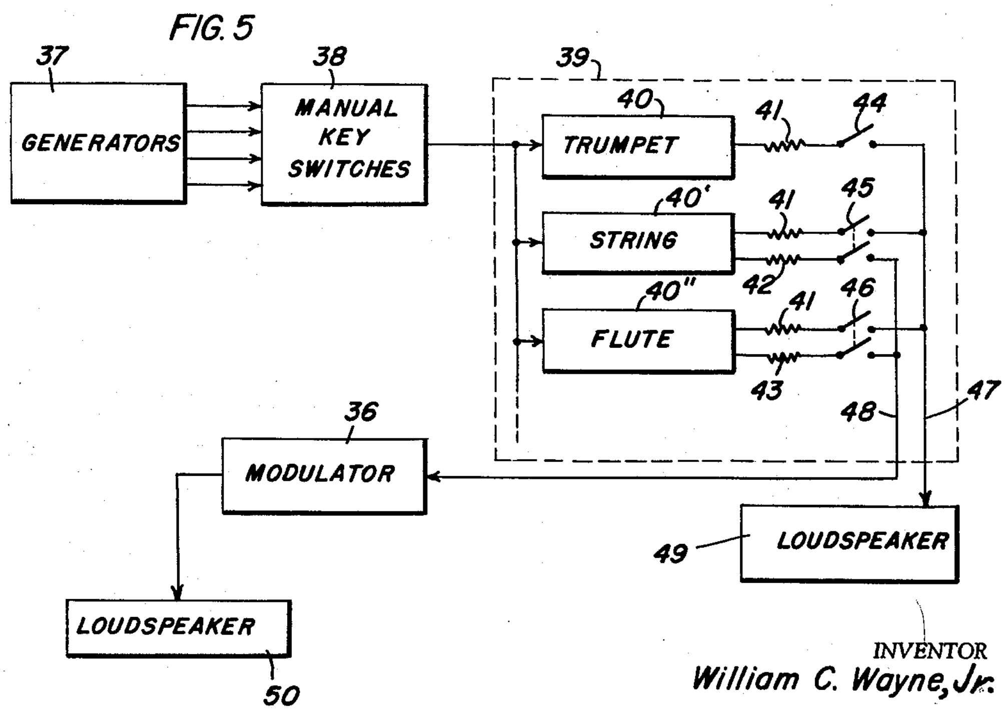

FIGURES *4a*, *4b*, and *4c* indicate amplitude, phase and frequency characteristics for a phase modulator according to the invention; and FIGURE 5 is a block diagram indicating one mode of application of the present system to an electronic organ system for certain ranks thereof.

Proceeding now more particularly by reference to the accompanying drawings, the reference numeral 10 denotes a source of audio frequencies, such as may be derived from an electrical or electronic musical instrument, or the like. In order to process the audio band in accordance with the principles of the present invention the audio frequency band is applied to the wideband 90° phase splitter 11, from which are applied to buses 12 and 13 the frequencies of audio band in phase $x$, and $x+90°$, respectively. Obviously, $x$ may be 0°. The signals present on the buses 12 and 13 are applied in parallel to balanced amplitude modulators, 14, 15 . . . , to each of which is applied a different vibrato frequency, in push-pull relation, from different and independent low frequency oscillators, 20, 21, . . . . The outputs of the several modulators are thus phase modulated with a maximum of ±45° at the low frequency rates.

[2] As used in the musical art, "partial" is herein inclusive of components of a tone, whether harmonically or inharmonically related to the fundamental frequency.

Figures 1, 2:
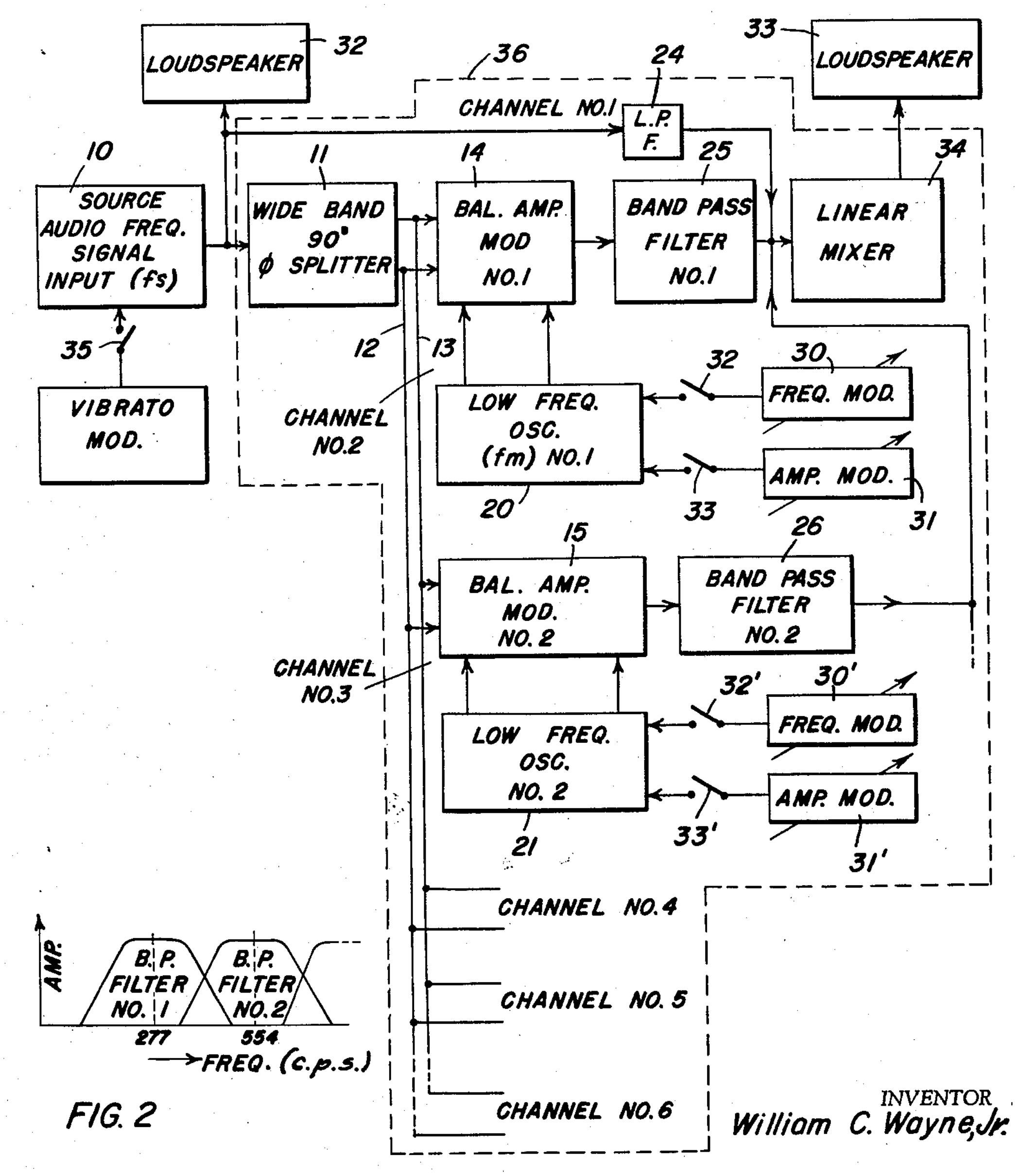
FIGURE 1 is a block diagram of a system according to the present invention.
FIGURE 2 is a plot of band pass filter characteristics, showing overlaps of adjacent filters.

The output of balanced amplitude modulators 14, 15, . . . are applied separately to band pass filters, 25, 26 . . . , respectively. The band pass filters 25, 26 . . . may be arranged each to pass one octaval sub-band, and a sufficient number of channels may be made available in a practical system to process each octave of an audio band. However, it is not essential that the band-pass filters 25, 26 . . . pass precisely one octave, i.e., they may and in general will overlap as shown in FIGURE 2, or certain octaves may be processed in two channels rather than in one in order to increase the interest of the tones processed by the system, or the bases of frequency division may be arbitrary, to suit design considerations.

The following mathematical analysis for one of the phase modulators will serve to illustrate the relationship between the amplitude and frequency of the modulator output and its modulating voltage. For simplicity, it is assumed the two 90° displaced phasors $\dot{P}$ and $\dot{Q}$ have equal, constant, amplitudes of magnitude one volt over a wide band in the absence of modulation. A sinusoidal modulating function is indicated, but more complex functions can be utilized for particular effects. The following symbols are used:

$\dot{R}_s$=the resultant modulator output (dots indicate complex quantities)

$\Delta\theta_s$=the change in the instantaneous phase angle of $R_s$ $m$=the per unit amplitude modulation index $w_s$=signal angular velocity $f_s=\frac{w_s}{2\pi}$=signal frequency $w_m$=modulating angular velocity $f_m=\frac{w_m}{2\pi}$=modulating frequency $\delta$=maximum percent peak to peak deviation in $f_s$.

Figure 3:
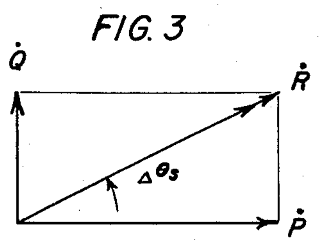
FIGURE 3 is a phasor diagram indicating 90° phase phasors amplitude modulated in opposite phase to provide a phase modulated resultant.

Referring to FIGURE 3:

$$\dot{P}_s=(1+m \sin w_m t) \sin w_s t \tag{1}$$

$$\dot{Q}_s=j(1-m \sin w_m t) \sin w_s t \tag{2}$$

$$\dot{R}_s=\dot{P}_s+\dot{Q}_s=\sqrt{2+2m^2 \sin^2 w_m t}\angle\Delta\theta_s \tag{3}$$

$$\Delta\theta_s=\arctan\frac{1-m \sin w_m t}{1+m \sin w_m t} \tag{4}$$

The time rate of change of $\Delta\theta_s$ is the change in angular frequency of $R_s$.

$$\frac{d\Delta\theta_s}{dt}=w_s=\frac{-mw_m \cos w_m t}{1+m^2-m^2 \cos^2 w_m t} \tag{5}$$

$$\Delta f_s=-mf_m\left(\frac{\cos w_m t}{1+m^2-m^2 \cos^2 w_m t}\right) \tag{6}$$

For $m$=1.00 and $w_m t=n\pi$ where $n$=0, 1, 2, 3, . . . , $$/\Delta f_s/_{max}=f_m \tag{7}$$

$$\delta=\frac{2fm}{fs}\times 100 \tag{8}$$

Figures 4A, 4B, 4C:
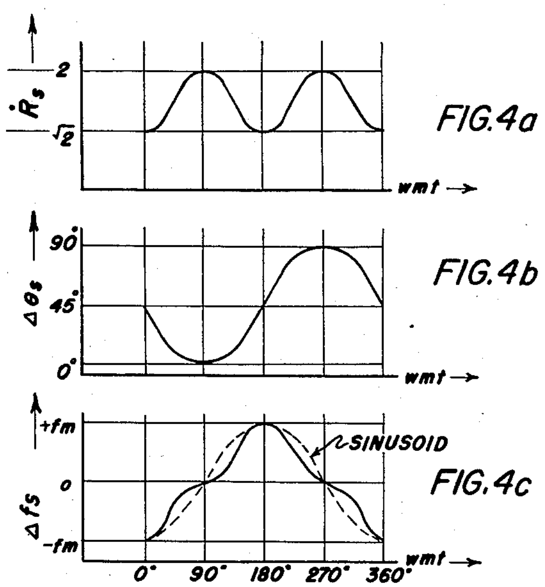

Plots of Equations 3 (magnitude only), 4, and 6 versus $w_m t$ are given in FIGURES 4*a*, 4*b*, and 4*c* respectively. It may be observed in 4*a* that, for the assumed sinusoidal modulating function, there results a residual sinusoidal amplitude modulation of $\dot{R}_s$ amounting to 17% peak to peak occurring at a rate twice that of *fm*. Furthermore, the departure in the waveform of frequency deviation from a sinusoidal function is clearly shown by comparison with the dotted curve in 4*c*.

In a system employing five modulated channels, and one low pass unmodulated channel, the following values of channel center frequency and modulating oscillator ranges, which are exemplary only, may be employed:

| Channel Number | Channel Center Frequency fc, c.p.s. | Vibrato Frequency fm, c.p.s. |
|---|---|---|
| 1 | Low Pass | None |
| 2 | 277 | 1.0 |
| 3 | 554 | 1.8 |
| 4 | 1,108 | 2.8 |
| 5 | 2,216 | 6.0 |
| 6 | 4,432 | 11.0 |

No modulation is used on the low frequency components of the source 10 transmitted by low pass filter 24 because it produces an indefiniteness in the bass or foundation tones of the musical material. Moreover, an economy in the required number of modulator channels is thus achieved.

In general, the vibrato frequency *fm* employed in any channel increases in proportion to the center frequency *fc* of the channel (*fm* approximately equals 0.3% of *fc*), but preferably the increase is not precise so that repetition patterns between the vibrato frequencies will have long periods. This adds variety and enhances the musical interest.

A band of audio frequencies may lie in the range of the overlap portions of two channel filters 25, 26 . . . . In this case, the audio frequencies will be doubly modulated in response to two low frequency modulating signals. Any given musical tone, made up of a number of substantially harmonically related frequencies, or partial frequencies, is subjected to an eventual division of these frequencies by the action of the band pass filters so that each frequency receives its appropriate, independent frequency modulation. Moreover, not only are the several modulating frequencies not locked in relative phase, but they need not impart equal frequency deviations throughout the total range of the complex input.

In contrast to two slightly detuned celeste ranks in the conventional pipe organ, the processed audio band is more random than a two rank celeste, whose maximum and minimum amplitude peaks of all harmonics in their beat wave bear a fixed relationship to one another, assuming constant timbre in time from each pipe. Thus, an input signal of low frequency string tone, having harmonics that lie throughout all the five modulated channels, yields an output that resembles an ensemble of more than two stringed instruments.

If desired, random effects may be heightened by also modulating the amplitudes and/or the frequencies of the low frequency modulating oscillators 20, 21, . . . , in response to frequency modulators 30, and/or amplitude modulators 31, selectively connected to the oscillators 20, 21 . . . , by means of switches 32, 33. The sets of amplitude and frequency modulators 30, 31 may themselves be asynchronous. Another scheme for randomizing the modulating voltage applied to the balanced modulator for channel 6, for example, is to linearly combine the outputs via suitable decoupling means of several of the lower frequency modulating sources such as 20 and 21 with the modulating source for channel 6.

A pleasing spatial effect may be achieved by transducing the unprocessed audio frequency band directly produced by source 10, via a loud speaker 32, and transducing the processed band via a spatially separated loudspeaker 33, which derives its input from a linear mixer 34 connected to all the band-pass filters 25, 26 . . ., in parallel. However, the direct and modulated channels may be electrically added and radiated from only one loudspeaker system with a consequent reduction in the third dimensional sound effect achieved with separate electroacoustical radiators.

A specific example indicating an application of the modulator 36 to an electronic organ tone coloring system is shown in FIGURE 5 in which primary generators 37 feed many audio frequency signals which may be selected by manual key switches 38 and delivered to a tone coloring system 39 consisting of filter networks 40, 40′, 40″ amplitude adjusting resistances 41, 42, 43, tone color selection switches 44, 45, 46, and output channels 47, 48 which feed spatially separated loudspeakers 49 and 50, the latter via modulator 36. Typical values of the resistances are 41=10,000 ohms, 42=100,000 ohms, and 43=10,000 ohms. Thus, the trumpet tone color receives no modulation, only a small portion of the total radiated string tone color is modulated, and one-half of the total radiated flute tone color is modulated. In this manner, the modulated portions of the various tone colors may be "voiced" for optimum musical results.

While I have described and illustrated one specific embodiment of my invention, it will be clear that variations of the general arrangement and of the details of construction which are specifically illustrated and described may be resorted to without departing from the true spirit and scope of the invention as defined in the appended claims.

What I claim is:

1. A system for processing plural octaves derived from a source of an audio phase vibrato band, comprising means operatively associated with said source for frequency modulating said audio frequency band in a plurality of parallel channels, each of said channels including a phase vibrato modulator and a source of modulating frequency, the several modulating frequencies being each different from any other, filters in at least some of said channels for separating out sub-bands of said audio frequency band, the sub-bands separated out in the several parallel channels being mutually distinguishable in respect to frequency content, and means operatively associated with said channels for combining the outputs of said channels to provide a processed audio frequency band, wherein the frequency durations provided by said phase vibrato modulators are selected to be approximately constant percentages of the phase modulated frequencies.

2. A system for processing an audio frequency band from a source, comprising means operatively associated with said source for phase modulating said audio frequency band in separate channels in response, respectively, to separate ones of a plurality of low modulating frequencies, means for generating said plurality of low modulating frequencies, means in said channels for separating from separate ones of said channels sub-bands of said audio frequency band having approximately equal percentage frequency deviations in consequence of said phase modulating, and means operatively associated with said channels for combining said sub-bands to provide a processed audio frequency band.

3. In a system for processing an audio frequency band comprising tones derived from a source, each of said tones having at least a fundamental frequency and a harmonic of said fundamental frequency, a source of a first modulating frequency, a source of a second and different modulating frequency, means operatively associated with said source of tones and with said first modulating source for electronically phase modulating at least a fundamental frequency of one of said tones in response to said first modulating frequency with a predetermined percentage frequency deviation, means operatively associated with said source of tones and with said second modulating source for electronically phase modulating said harmonic frequency of said one of said tones in response to said second modulating frequency with at least approximately said predetermined frequency deviation, and means operatively associated with both said modulating means for constituting the modulated fundamental frequency and the modulated harmonic frequency as an audible signal.

4. In a system for processing an audio frequency band comprising tones derived from a source, each of said tones having at least a fundamental frequency and a partial of said fundamental frequency, a source of a first modulating frequency, a source of a second and different modulating frequency, means operatively associated with said source of tones and with said first modulating source for phase modulating said fundamental frequency with a frequency deviation of predetermined extent in response to said first modulating frequency, means operatively associated with said source of tones and with said second modulating source for phase modulating said partial of said fundamental frequency in response to said second and different modulating frequency with a frequency deviation of at least approximately said predetermined extent and means operatively associated with both said phase modulating means for audibly combining the modulated frequencies.

5. In a system for processing an audio frequency band composed of adjacent sub-bands derived from an source of said band, said adjacent sub-bands having center frequencies which are substantially harmonically related, means operatively associated with said source for phase modulating the entire frequency content of each of said sub-bands at a different rate, the rates assigned to said sub-bands being at least approximately proportional to the center frequencies of the respective bands.

6. In a system for processing audio frequency bands representative of music, a source of a first audio frequency band having tonal components including fundamental frequencies and harmonics of said fundamental frequencies, means operatively associated with said source for differently phase modulating each of a plurality of sub-bands of said first audio frequency band to provide a second audio frequency band having approximately equal frequency deviations over said band in response to the phase modulators and means operatively associated with said source for simultaneously transmitting into a common space from separate electro-acoustic transducers acoustic energy corresponding in frequency spectrum content with said first audio frequency band and with said second audio frequency band, respectively.

7. In a system for processing audio frequency bands representative of music, a source of a first audio frequency band having tonal components including fundamental frequencies and harmonics of said fundamental frequencies, means operatively associated with said source for frequency modulating all of said unmodulated tonal components with a common percentage frequency deviation and a common modulating frequency to generate a simple vibrato modulated audio frequency band, means operatively associated with said source and with said last-mentioned means operatively associated with said source for frequency modulating different ones of said unmodulated tonal components with different modulating frequencies and with approximately a common percentage frequency deviation, to provide a complex vibrato modulated audio frequency band, and means for transmitting simultaneously into a common space acoustic energy corresponding with said simple vibrato modulated audio frequency band and with said complex vibrato modulated audio frequency band.

8. In combination, an electronic organ including a plurality of key controlled audio frequency tone generators, a wide band phase splitter connected in cascade with said tone, a plurality of phase modulators connected in parallel with each other and each in cascade with said wide band phase splitter, a separate sub-audio oscillator connected to each of said phase modulators in modulating relation thereto, said sub-audio oscillators each having a different frequency, said phase modulators being arranged and adapted to provide phase modulations of the outputs of said phase splitter in response to the signal outputs of said sub-audio oscillators with peak phase deviations approximately proportional to the peak amplitudes of the said outputs, a separate audio frequency filter connected in cascade with each of said phase modulators, each of said separate filters having a different pass band, said pass bands being contiguous in pairs, and the overall pass band of said band-pass filters being a filled audio frequency band, the peak amplitudes of said outputs of said sub-audio oscillators and the frequencies of said outputs being selected to provide an approximately constant percentage deviation of the frequencies of said audio frequency tone generators over said audio band.

References Cited in the file of this patent

UNITED STATES PATENTS

| | | |
|---|---|---|
| 1,877,317 | Hitchcock | Sept. 13, 1932 |
| 1,990,023 | Eremeeff | Feb. 5, 1935 |
| 2,107,804 | Roux et al. | Feb. 8, 1938 |
| 2,121,142 | Dudley | June 21, 1938 |
| 2,169,762 | Kaye | Aug. 15, 1939 |
| 2,208,922 | Butler | July 23, 1940 |
| 2,233,183 | Roder | Feb. 25, 1941 |
| 2,295,000 | Morse | Sept. 8, 1942 |
| 2,403,232 | Parisier | July 2, 1946 |
| 2,445,662 | Davie | July 20, 1948 |
| 2,474,249 | Hodgson et al. | June 28, 1949 |
| 2,509,923 | Hanert | May 30, 1950 |
| 2,522,369 | Guanella | Sept. 12, 1950 |
| 2,566,876 | Dome | Sept. 4, 1951 |
| 2,574,577 | Martin et al. | Nov. 13, 1951 |
| 2,614,245 | Chireix | Oct. 14, 1952 |
| 2,635,226 | Harris | Apr. 14, 1953 |
| 2,817,711 | Feldman | Dec. 24, 1957 |
| 2,840,639 | Graham | June 24, 1958 |
| 2,852,604 | MacCutcheon | Sept. 16, 1958 |
| 2,855,462 | Adams | Oct. 7, 1958 |
| 2,874,222 | Jager | Feb. 17, 1959 |

OTHER REFERENCES

Fox: "A Waveform Sythesizer," 84–1.22, Electronic Engineering, September 1955, pages 374–378.